(12) United States Patent
Blankenship

(10) Patent No.: US 6,842,828 B2
(45) Date of Patent: Jan. 11, 2005

(54) METHODS AND ARRANGEMENTS TO ENHANCE AN UPBOUND PATH

(75) Inventor: Robert G. Blankenship, Tacoma, WA (US)

(73) Assignee: Intel Corporation, Santa Clara, CA (US)

(*) Notice: Subject to any disclaimer, the term of this patent is extended or adjusted under 35 U.S.C. 154(b) by 426 days.

(21) Appl. No.: 10/135,552

(22) Filed: Apr. 30, 2002

(65) Prior Publication Data

US 2003/0204679 A1 Oct. 30, 2003

(51) Int. Cl.$^7$ .............................................. G06F 13/14
(52) U.S. Cl. ..................................................... 711/141
(58) Field of Search ................................. 711/118, 141; 710/52

(56) References Cited

U.S. PATENT DOCUMENTS 6,405,276 B1 * 6/2002 Chen et al. ................. 710/310
6,760,793 B2 * 7/2004 Kelley et al. ................. 710/52

* cited by examiner

Primary Examiner—Kevin L. Ellis
(74) Attorney, Agent, or Firm—Jeffrey B. Huter

(57) ABSTRACT

A cache coherency arrangement to enhance an upbound path for input-output interfaces is disclosed. Several embodiments may enhance upbound write bandwidth and buffer utilization. Some embodiments may comprise requesting content of a memory granule and merging the content with data associated with a write request for the memory granule prior to satisfaction of an ordering rule associated with the write request. Many embodiments may comprise ownership stealing to enhance inbound bandwidth and to prevent or attenuate starvation and/or deadlock of transactions or of an input-output interface for transactions. Such embodiments may also comprise invalidating merged content of the memory granule. Further embodiments may comprise reverting the merged content to the data associated with the write request.

30 Claims, 4 Drawing Sheets

METHODS AND ARRANGEMENTS TO ENHANCE AN UPBOUND PATH

BACKGROUND

Coherent transactions limit the bandwidth for transactions from a peripheral input-output (I/O) bus in processor-based systems such as desktop computers, laptop computers and servers. Processor-based systems typically have a host bus that couples a processor and main memory to ports for I/O devices. The I/O devices, such as Ethernet cards, couple to the host bus through an I/O controller or bridge via a bus such as a peripheral component interconnect (PCI) bus. The I/O bus has ordering rules that govern the order of handling of transactions so an I/O device may count on the ordering when issuing transactions. When the I/O devices may count on the ordering of transactions, I/O devices may issue transactions that would otherwise cause unpredictable results. For example, after an I/O device issues a read transaction for a memory line and subsequently issues a write transaction for the memory line, the I/O device expects the read completion to return the data prior to the new data being written. However, the host bus may be an unordered domain that does not guaranty that transactions are carried out in the order received from the PCI bus. In these situations, the I/O controller governs the order of transactions.

The I/O controller places the transactions in an ordering queue in the order received to govern the order of inbound transactions from an I/O bus, and waits to transmit the inbound transaction across the unordered interface until the ordering rules corresponding to each transaction are satisfied in the ordering queue. When a partial write is received and only a full memory line may be written to memory, such as main memory, the data for the partial write is merged with the full memory line upon satisfying the ordering rules and then forwarded to main memory. However, buffer space must be maintained for the data of each partial write and the memory line to merge with the data for each partial write until the inbound transaction satisfies ordering requirements.

I/O devices continue to demand increasing bandwidth and unnecessary delay for transactions in an ordering queue is particularly wasteful. Further, when multiple I/O devices transmit coherent transactions to the I/O controller, transactions unnecessarily wait in the ordering queue for coherent transactions with unrelated ordering requirements and the buffer space requirements increase. A conventional way to meet increasing demand for bandwidth is to increase the number of ports available for I/O devices at the I/O controller and memory controller for main system memory. The increase in ports, however, increases complexity and cost of such a memory controller and drives up overall system cost.

BRIEF FIGURE DESCRIPTIONS

In the accompanying drawings, like references may indicate similar elements:

FIG. 1 depicts an embodiment of a system to transact between an ordered and an unordered interface with a processor coupled with an input-output hub.

DETAILED DESCRIPTION OF EMBODIMENTS

Figure 2:
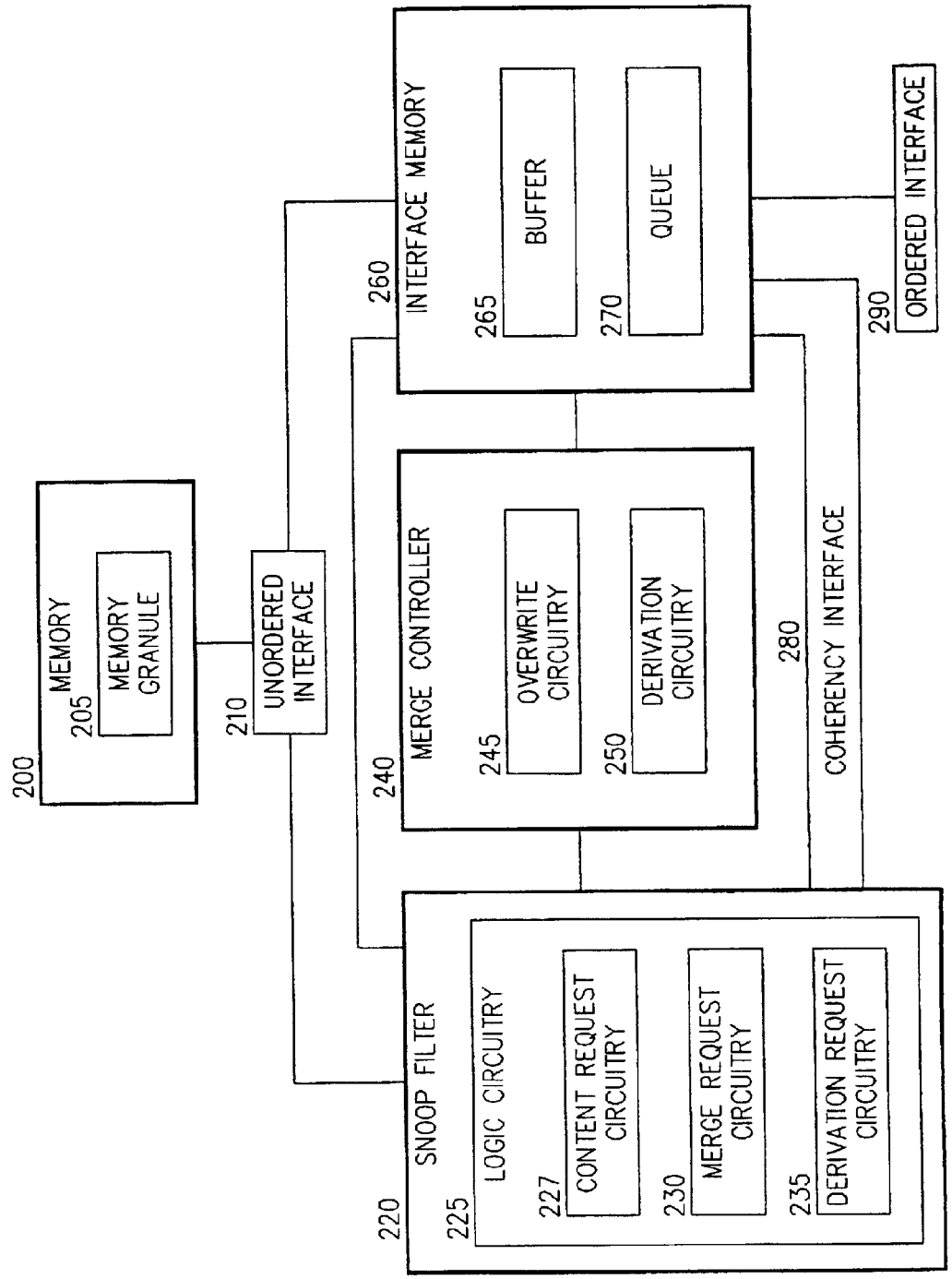
FIG. 2 depicts an embodiment of an apparatus of an input-output hub to maintain ordering for transactions and enhance an upbound path.

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

A cache coherency arrangement to enhance an upbound path for input-output interfaces is disclosed. Several embodiments may enhance upbound write bandwidth and buffer utilization. Some embodiments may comprise requesting content of a memory granule and merging the content with data associated with a write request for the memory granule prior to satisfaction of an ordering rule associated with the write request. Many embodiments may comprise ownership stealing to enhance inbound bandwidth and to prevent or attenuate starvation and/or deadlock of transactions or of an input-output interface for transactions. Such embodiments may also comprise invalidating merged content of the memory granule. Further embodiments may comprise reverting the merged content to the data associated with the write request.

Figure 1:
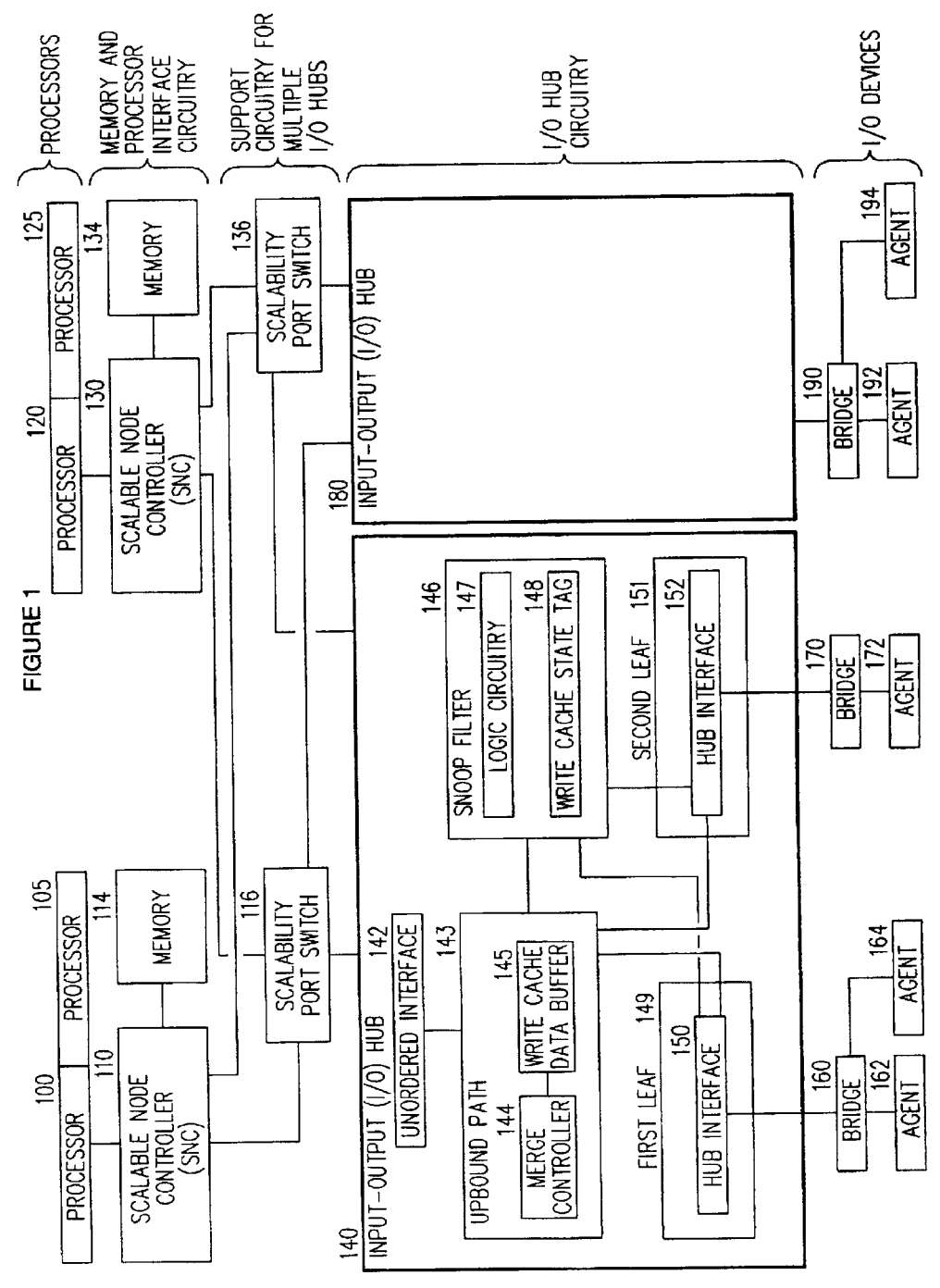

Referring now to FIG. 1, there is shown an embodiment of a system to transact between an ordered and an unordered interface. The embodiment may comprise processors such as processors 100, 105, 120, and 125; processor interface circuitry, such as scalable node controllers 110 and 130; memory 114 and 134; input-output (I/O) hub circuitry, such as I/O hub 140 and I/O hub 180; and I/O devices, such as bridges 160, 170, and 190. In embodiments that may comprise more than one I/O hub, such as I/O hub 140 and I/O hub 180, support circuitry for multiple I/O hubs may couple the processor interface circuitry with the multiple hubs to facilitate transactions between I/O hubs 140 and 180 and processors 100, 105, 120, and 125.

Scalable node controllers 110 and 130 may couple with processors 100 and 105, and 120 and 125, respectively, to apportion tasks between processors 100, 105, 120, and 125. In some of these embodiments, scalable node controller 110 may apportion processing requests between processor 100 and processor 105, as well as between processors 100 and 105 and processors 120 and 125, for instance, based upon the type of processing request and/or the backlog of processing requests for processors 100 and 105 and processors 120 and 125.

In several embodiments, scalable node controller 110 may also coordinate access to memory 114 between processors, 100 and 105, and I/O hubs, 140 and 180. Support circuitry for multiple I/O hubs, scalability port switches 116 and 136, may direct traffic to scalable node controllers 110 and 130 based upon a backlog of transactions. In addition, scalability port switches 116 and 136 may direct transactions from scalable node controllers 110 and 130 to I/O hubs 140 and 180 based upon destination addresses for the transactions. In many embodiments, memory 114 and memory 134 may comprise an entry that may not be shared, often referred to as "exclusive" ownership, so a write transaction may be forwarded to either memory 114 or memory 134. In some embodiments, processors 100, 105, 120, and 125 and/or SNC's 110 and 130 may maintain cache copies of entries in memory 114 and 134.

Memory 114, for instance, may comprise an entry stored in memory granule 115. Memory granule 115 may comprise an entry common to both memory 114 and cache or may comprise an entry exclusively owned by memory 114. Memory granule 115, in some embodiments, may comprise a granule, or the smallest unit of memory that may be written to and/or read from memory 114. For example, a write request by agent 162 may request that memory granule 115 be updated with write data. The write data may comprise data to update part of the content of memory granule 115. In such situations, the write data may be referred to as a partial write. The content of memory granule 115 may be forwarded to I/O hub 140 along with "exclusive" ownership to the content, merged with the write data, and the merger of the content with the write data may overwrite the entire content of memory granule 115. Other cache copies of memory granule 115 may be invalidated. In several of these embodiments, a granule of memory may comprise a memory line and in such embodiments, a request to write less than a memory line of data may comprise a partial write.

I/O hubs 140 and 180 may operate in a similar manner to bridge transactions between an ordered transactional domain and an unordered transactional domain. The transactions may be bridged by routing traffic between I/O devices and scalability ports and maintaining a transaction order for requests such as a write request, in accordance with an ordering rule such as an ordering rule associated with a PCI bus. In some embodiments, I/O hubs 140 and 180 may provide peer-to-peer communication between I/O interfaces. In particular, I/O hub 140 may comprise unordered interface 142, upbound path 143, snoop filter 146, a first leaf 149 comprising hub interface 150; and second leaf 151 comprising hub interface 152.

Unordered interface 142 may facilitate communication between I/O hub 140 and a scalable node controller such as 110 and 130 with circuitry for a scalability port protocol layer, a scalability port link layer, and a scalability port physical layer. In some embodiments, unordered interface 142 may comprise simultaneous bi-directional signaling. Unordered interface 142 may couple to scalability port switches 116 and 136 to transmit transactions between scalability node controllers 110 and 130 and agents 162, 164, and 172. Transactions between unordered interface 142 and scalability node controllers 110 and 130 may transmit in no particular order or in an order based upon the availability of resources or ability for a target to complete a transaction. Transmission order may not be based upon, for instance, a particular transaction order according to ordering rules of an I/O interface, such as a PCI bus.

Unordered interface 142 may be responsive to logic circuitry 147 of snoop filter 146. For example, when agent 162 may initiate a transaction to write data to memory 114, agent 162 may transmit a write request comprising a header and write data. Bridge 160 may receive the write request and may forward the write request to hub interface 150. Hub interface 150 may maintain the transaction order of the write request with respect to other transactions received via bridge 160. Logic circuitry 147 may then forward the header to unordered interface 142 or pre-fetch ownership for the write request. Unordered interface 142 may respond by forwarding the header or ownership request to scalability port switch 116. When the write request may be a partial write, pre-fetching ownership may comprise a read request.

Upbound path 143 may comprise a path for hub interfaces 150 and 152 to issue transactions to unordered interface 142 and to snoop filter 146. Upbound path 143 may also couple with hub interface 150 and/or 152 to obtain and merge a content of memory 114 and/or 134 with write data prior to satisfaction of the ordering rule such as an ordering rule associated with a partial write transaction. For example, upbound path 143 may carry inbound coherent requests such as the merger of a partial write request with the content of memory 114 and 134 to unordered interface 142 to write the merger to memory granule 115. Upbound path 143 may also carry ownership requests from hub interfaces 150 and 152 to snoop filter 146.

In the present embodiment, upbound path 143 may comprise merge controller 144 and write cache data buffer 145. Merge controller 144 may couple with interface memory such as buffer 144, an ordering queue, or the like, and communicate with unordered interface 142 to merge the content of memory such as memory granule 115 with a write request comprising write data such as a partial write. Merging the content of memory 114 with a write request may advantageously reduce the size of write cache data buffer 145 when the content may be merged with the write request prior to the satisfaction of an ordering rule. For example, first leaf 149 may receive a write request for memory granule 115. The write request may comprise write data to update part of the content for memory granule 115. Snoop filter 146 may pre-fetch ownership of memory granule 115 and after the content is received at write cache data buffer 145, merge controller 144 may store a combination of the content and the write data in buffer 144 rather than storing both the content and the write data. In other embodiments, the write data of the write request may be stored in an ordering queue or other interface memory.

In many embodiments, upbound path 143 may comprise a pending transaction buffer such as a local request buffer to store a pending transaction such as an ownership request for a write transaction on unordered interface 142 until a scalability port switch 116 or 136 may retrieve or may be available to receive the pending transaction. The local request buffer may facilitate a conflict check between the ownership request and other pending transactions. For instance, the local request buffer may receive the ownership request in response to receipt of the write request by leaf 149 or leaf 151.

Further, when an I/O hub such as I/O hub 140 may couple more than one I/O interface, 150 and 154, to scalability port switches 116 and 136, I/O hub 140 may comprise arbitration circuitry to grant access of upbound path 143 to transactions of first leaf 149 and second leaf 151. In many embodiments, arbitration circuitry may provide substantially equivalent access to unordered interface 142. In other embodiments, arbitration circuitry may arbitrate between first leaf 149 and second leaf 151 based upon a priority associated with, or an agent coupled with, first leaf 149 and/or second leaf 151.

Snoop filter 146 may issue ownership requests on behalf of transactions in hub interfaces 150 and 152, return ownership completions to hub interfaces 150 and 152, monitor pending transactions on unordered interface 142, respond to downbound snoop requests from unordered interface 142 or from a peer hub interface, and issue requests to combine or revert a combination of write data of partial write requests with a granule of memory from memory 114 and 134. Snoop filter 146 may comprise logic circuitry 147 and write cache state tag 148. Logic circuitry 147 may manage the merger of write data for a partial write. For example, logic circuitry 147 may issue a request to pre-fetch ownership of a granule of memory such as memory granule 115 in response to receipt of a write request by hub interface 150 or other interface memory such as a queue associated with hub interface 150. In some embodiments, if the write request is in "modified" state, ownership may be given to the write in response to receipt of the write request. After receiving the content of the granule and storing the content in write cache data buffer 145, logic circuitry 147 may request that a combination of the content and the write data of the write request overwrite the write data stored in write cache data buffer 145. In some instances, snoop filter 146 may respond a snoop request from unordered interface 142 to invalidate the pre-fetched ownership of the memory granule 115 by the write request. Snoop filter 146 may receive the snoop request and may revert a merger of the content with the write data in response to the snoop request. In many of these embodiments, logic circuitry 147 of snoop filter 146 may request that the content of memory granule 115 be determined from the combination of the content and the write data in write cache data buffer 145 and transition the state of the write request from "exclusive" to invalid" in write cache state tag 148. In other embodiments, merge controller 144 may respond by overwriting the combination with the write data based upon the header of the write request stored in an ordering queue. In other instances, snoop filter 146 may respond to a snoop request of another hub interface, such as hub interface 152, to invalidate an ownership of the memory granule 115 and derivation circuitry of merge controller 144 may derive the write data from the merger.

In addition, snoop filter 146 may perform conflict checks between snoop requests, ownership requests, and ownerships of memory lines in memory 114 or memory 134. For example, a write transaction waiting at hub interface 150 to write data to memory granule 115 may reach a top of an ordering queue in hub interface 150. After the write transaction may reach the top of the queue, hub interface 150 may request ownership of memory granule 115 for the write transaction via snoop filter 146. Snoop filter 146 may perform a conflict check with the ownership request and determine that the ownership request may conflict with the ownership of memory granule 115 by a pending write transaction on unordered interface 142. Snoop filter 146 may respond to the ownership request by transmitting an invalidation request to hub interface 150.

Subsequently, hub interface 150 may reissue a request for ownership of memory granule 115 for the write transaction and snoop filter 146 may perform a conflict check and determine that no conflict exists with an ownership by the write transaction. Then, snoop filter 146 may transmit a request for ownership to scalable node controller 110 via scalability port switch 116. In response, snoop filter 146 may receive an ownership or snoop completion for memory granule 115 and may return the ownership completion to hub interface 150 and the content of memory granule 115 to write cache data buffer 145. On the other hand, when the write transaction was in "modified" state, snoop filter 146 may complete the transaction.

In many embodiments, hub interface 150 may receive the ownership completion for a transaction and may modify the coherency state of the transaction to 'exclusive'. In several of these embodiments, snoop filter 146 may maintain the coherency state of the transaction in interface memory such as a buffer in snoop filter 146. Logic circuitry 147, in response to the snoop completion, may issue a request to merge controller 144 to merge the content of memory granule 115 with the write data for the write request.

Hub interfaces 150 and 152 may operate in a similar manner, to forward transactions from bridges 160 and 170 to unordered interface 142. Hub interfaces 150 and 152 may maintain a transaction order for transactions received in accordance with ordering rules associated with bridge 160 and bridge 170, respectively. In some embodiments, hub interfaces 150 and 152 may comprise one or more queues coupled with an ordered interface such as bridges 160 and 170 respectively, to store upbound transactions such as a write request to maintain the transaction order. Hub interfaces 150 and 152 may also determine the coherency state of transactions received. For example, hub interface 150 may receive a write transaction from agent 164 via bridge 160 and place the header for the write transaction in an inbound ordering queue, or, in some embodiments, an upbound ordering queue. Substantially simultaneously hub interface 150 may request ownership of the memory line associated the write transaction via snoop filter 146. Requesting ownership when the write transaction may not satisfy ordering rules associated with I/O interface 150, may be referred to as pre-fetching ownership. On the other hand, when the inbound ordering queue is empty and no transactions are pending on unordered interface 142, the write transaction may transmit to upbound path 143 upon receipt of a completion in response to a request for ownership to transmit across unordered interface 142.

Snoop filter 146 may receive the request for ownership and perform a conflict check. In some instances, snoop filter 146 may determine a conflict with the ownership by the write transaction. Since the coherency state of the write transaction may be pending when received, snoop filter 146 may deny the request for ownership. After the transaction order of the write transaction may satisfy one or more ordering rules, or, in some embodiments, after the write transaction reaches the top of the ordering queue, hub interface 150 may reissue a request for ownership and receive an ownership completion. In response to receiving the ownership completion for the write transaction, hub interface 150 may change the coherency state of the write transaction to 'exclusive' and then to 'modified'. Snoop filter may request write data be merged with the content of memory granule 115 and upbound path 143 may merge the content with the write data. In some embodiments, when the transaction may be at the top of the ordering queue upon receipt of the ownership completion, hub interface 150 may change the coherency state of the write transaction directly to 'modified', making the merged data of the write transaction globally visible. In several embodiments, hub interface 150 may transmit the transaction header of the write transaction to snoop filter 146 to indicate the change in the coherency state to 'modified'.

On the other hand, after hub interface 150 may receive the ownership completion in response to pre-fetching ownership, hub interface 150 may change the coherency state of the write transaction from a pending or non-ownership state to 'exclusive'. The content of memory granule 115 may be combined with the write data of the write transaction and hub interface 150 may maintain the transaction in 'exclusive' state until the write transaction may satisfy associated ordering rules or the ownership may be invalidated or stolen. For example, ordering rules governing transactions received via bridge 160 from agent 162 may be independent or substantially independent from ordering rules governing transactions received from agent 164. As a result, many embodiments allow a second transaction to steal or invalidate the ownership of the memory granule 115 by a first transaction to transmit to upbound path 143 when the ordering of the second transaction is independent or substantially independent from the ordering of the first transaction. Stealing the ownership may cause the content of memory granule 115 to be invalidated so the combination of the content with the write data of the first transaction may be invalidated or replaced with the write data. Ownership stealing may prevent backup, starvation, deadlock, or stalling of the second transaction or the leaf comprising the second transaction as a result of the transaction order of the first transaction. In many of these embodiments, ownership may be stolen when the first transaction may reside in a different leaf from the second transaction and/or in the same leaf.

In the present embodiment, hub interface 152 may operate in a similar manner as hub interface 150, but hub interface 152 may maintain a transaction order for transactions from bridge 170 according to ordering rules independent or substantially independent from ordering rules associated with hub interface 150. As a result, the embodiment may take advantage of the unrelated transaction ordering between first leaf 149 and second leaf 151 by determining a coherency state for upbound transactions based upon a conflict and a transaction order, to take the ownership from the upbound transaction. For instance, agent 172 may initiate a first write transaction to memory granule 115 via bridge 170 and hub interface 152 may receive the first write transaction. After hub interface 152 receives the first write transaction, hub interface 152 may request ownership of memory granule 115 via snoop filter 146. The first write transaction may receive an ownership completion although the first write transaction may also be placed in the bottom of an ordering queue of hub interface 152. The content of memory granule 115 may be received by second leaf 151 along with the completion and the content may be merged with write data of the first write transaction. Agent 162 may initiate a second write transaction for memory granule 115 and hub interface 150 may forward the second write transaction to an ordering queue of hub interface 150 to maintain a transaction order according to an ordering rule associated with agent 162. The second write transaction for memory granule 115 may reach the top of the ordering queue of hub interface 150 and may be forwarded to snoop filter 146 to initiate a conflict check before the first write transaction may satisfy ordering rule(s) associated with agent 172 or reach the top of the ordering queue of hub interface 152. In many of these embodiments, snoop filter 146 may comprise memory to store one or more write transactions or write transaction headers until the second write transaction may be forwarded to unordered interface 142 First leaf 149 may perform a conflict check before the second write transaction or header of the second write transaction may be forwarded to snoop filter 146.

Snoop filter 146 may issue a request to invalidate the ownership by the write transaction in hub interface 152. Hub interface 152 may determine that the transaction order of the first write transaction still may not satisfy the ordering rules or the first write transaction may not be at the top of the queue and may accept the invalidation of ownership, stealing or taking the ownership from the first write transaction. The merged content of memory granule 115 and the write data of the first write transaction may be invalidated. Then, hub interface 150 may forward the second write transaction to upbound path 143.

In the present embodiment, bridges 160, 170 and 190, an input-output device couple one or more agents 162, 164, 172, 192 and 194 to I/O hubs 140 and 180 from an ordered transactional domain such as a peripheral component interconnect (PCI) bus, a universal serial bus (USB), and/or an infiniband channel. Agents 162, 164, 172, 192 and 194 may transact upbound to initiate a write request comprising write data to modify a content of a memory granule or peer-to-peer via I/O hubs 140 and 180. In many of these embodiments, agents 162, 164, 172, 192, and 194 may transact with any processor and processors 100, 105, 120, and 125 may transact with any agent.

Referring now to FIG. 2, there is shown an embodiment of an apparatus of an input-output hub to maintain ordering for transactions between an ordered transactional domain via ordered interface 290, and unordered transactional domain via unordered interface 210. The embodiment may comprise memory 200, unordered interface 210, snoop filter 220, merge controller 240, interface memory 260, coherency interface 280, and ordered interface 290. Memory 200 may comprise a system memory such as a DRAM coupled with a front side bus (FSB) to unordered interface 210. Memory 200 may also facilitate transactions in a granular size such as memory granule 205.

Some embodiments may comprise snoop filter 220 to couple with the interface memory 260 to receive snoop requests and determine conflicts between pre-fetched ownership by an upbound transaction and another transaction. For example, snoop filter 220 may receive a snoop request from unordered interface 210 or ordered interface 290 and invalidate ownership of memory granule 205 by an upbound transaction based upon a conflict. For instance, when a write request acquires ownership of memory granule 205 prior to satisfaction of an ordering rule related to the transaction order of the write request and snoop filter 220 receives a snoop request for memory granule 205, snoop filter 205 may cause the ownership by the write request to be invalidated. Snoop filter 210 may also invalidate a copy or copies of the content of memory granule 205 based upon the snoop request.

Snoop filter 220 may comprise logic circuitry 225. Logic circuitry 225 may couple with unordered interface 210 to request the content in response to the write request. Logic circuitry 225 may comprise content request circuitry 227, merge request circuitry 230, and derivation request circuitry 235. Content request circuitry 227 may forward a header associated with the write request to the unordered interface 210. Forwarding the header to unordered interface 210 may represent a request for ownership and a request for the content of memory granule 205.

Merge request circuitry 230 may couple with merge controller 240 to request a merger of the content with the write request. For instance, receipt of a completion in response to forwarding a header to unordered interface 210 may indicate ownership by a corresponding write request. The write request may comprise write data to replace part of the content of memory granule 205 so the content may be read from memory 200 and returned via unordered interface 210. Merge request circuitry 230 may react to the completion by transmitting a request to merge controller 240 to merge the content with the write request to reduce the amount of buffer space of buffer 265 to store the content and the write data of the write request separately.

Derivation request circuitry 235 may respond to a snoop request that invalidates the ownership of memory granule 205 by the write request. For instance, after pre-fetching ownership for the write request, a snoop request such as a downbound snoop request may cause snoop filter to invalidate the ownership. Derivation request circuitry 235 may respond by transmitting a request to merge controller 240 to invalidate a copy of the content merged with write data of the write request or to revert the merger of the content and the write data to write data without the content.

Merge controller 240 may couple with interface memory 260 to merge the content with the write request prior to satisfaction of an ordering rule associated with the write request. In several embodiments, merge controller 240 may comprise overwrite circuitry 245 and derivation circuitry 250. Overwrite circuitry 245 may couple with interface circuitry 260 to overwrite part of the content in accordance with the write request. For instance, after receiving a request to merge the content and write data corresponding to a write request, overwrite circuitry 245 may overwrite an entry in interface memory 260 with a merger of the content and the write data associated with a write request before with forwarding the write request to unordered interface 210.

Derivation circuitry 250 may derive the write data from a merger of the content with the write request in response to an invalidation of the content. For example, when the content is merged with the write data of a write request before the write request may be forwarded to unordered interface 210, snoop filter 220 may determine that a conflict exists between the write request and another transaction. The ownership by the request may be invalidated by snoop filter 220 and derivation request circuitry 235 may request that the merger of the content with the write request be invalidated. Invalidating the content may comprise modifying the state of the write request from "exclusive" to "invalid". In response to the request for invalidation of the merger, derivation circuitry 250 may determine the content remaining in the merger and replace the content with a subsequent content of memory granule 205. In some embodiments, the remaining content may be determined based upon a header of the write request. In further embodiments, the write data of the write request may be read from the merger, the content of the merger may be written over with the subsequent content of memory granule 205, and the write data may be written over part of the subsequent content in accordance with the write request.

Interface memory 260 may store a write request and may receive a content of a memory granule 205 associated with the write request from unordered interface 210. Interface memory 260 may comprise buffer 265 and queue 270. Buffer 265 may couple with unordered interface 210 to receive the content of memory granule 205 and may couple with merge controller 240 to store a merger of the content with write data associated with the write request. For example, after receiving the write request, write data of the write request may be stored in buffer 265 and ownership of memory granule 205 may be forwarded to unordered interface 210. The content of memory granule 205 may also be read and forwarded to buffer 265 via unordered interface 210. Merge controller 240 may receive a request to merge the content with the write data so the content and the write data may be stored in a granule of buffer 265. Merge controller 240 may read the write data from buffer 265 and write the write data over the content stored in buffer 265 in accordance with the write request. The resulting entry in buffer 265 may comprise the new content for memory granule 205 if the content received from memory granule 205 remains valid until the transaction order of the write request satisfies an ordering rule and the write request is forwarded to unordered interface 210.

Queue 270 may couple with ordered interface 290 to maintain a transaction order for a header of the write request based upon an ordering rule associated with the write request. In many embodiments, queue 270 may comprise an ordering queue in a hub interface. For example, ordered interface 290 may receive transactions from one or more agents coupled with ordered interface 290. The agent(s) may expect the transactions to be completed in order. If the transactions were forwarded to unordered interface 210 without waiting for each transaction to be completed in the expected transaction order, the results of the transactions may be unpredictable. Thus, queue 270 may store the header of each transaction until the transaction order of a transaction satisfies an ordering rule(s) associated the agent(s).

Many embodiments may further comprise coherency interface 280 to couple with snoop filter 220 to invalidate the content in response to a snoop request. Coherency interface 280 may relay internal coherency completion and invalidation requests from snoop filter 210 to circuitry associated with queue 270. These coherency requests may be generated by snoop filter 220 and may be the result of an ownership completion, a downbound snoop request, or an inbound coherent transaction. In some embodiments, coherency interface 280 may couple with buffer 265 to relay coherency requests. In particular, coherency interface 280 may couple with a reverse routing field in snoop filter 220 that addresses a specific entry in queue 270 and a request field of snoop filter 220 to indicate the receipt of an ownership completion or an invalidation request. For example, after snoop filter 220 receives an ownership completion across unordered interface 210, snoop filter 220 may use the routing field to forward the completion across coherency interface 280 to circuitry coupled with queue 270. The circuitry coupled with queue 270 may invalidate the corresponding entry such as a write request combined with the content of memory granule 205 when a snoop request invalidates pre-fetched ownership of the entry and the write transaction is blocked by other transactions in queue 270 according to an ordering rule. Otherwise, queue 270 may not accept the invalidation. The merged data may be returned in response to a snoop request and the content may be merged with a local conflicting write transaction that satisfies corresponding ordering rules; or the merged data may be written to memory granule 205 in response to a local conflicting read transaction.

Figure 3:
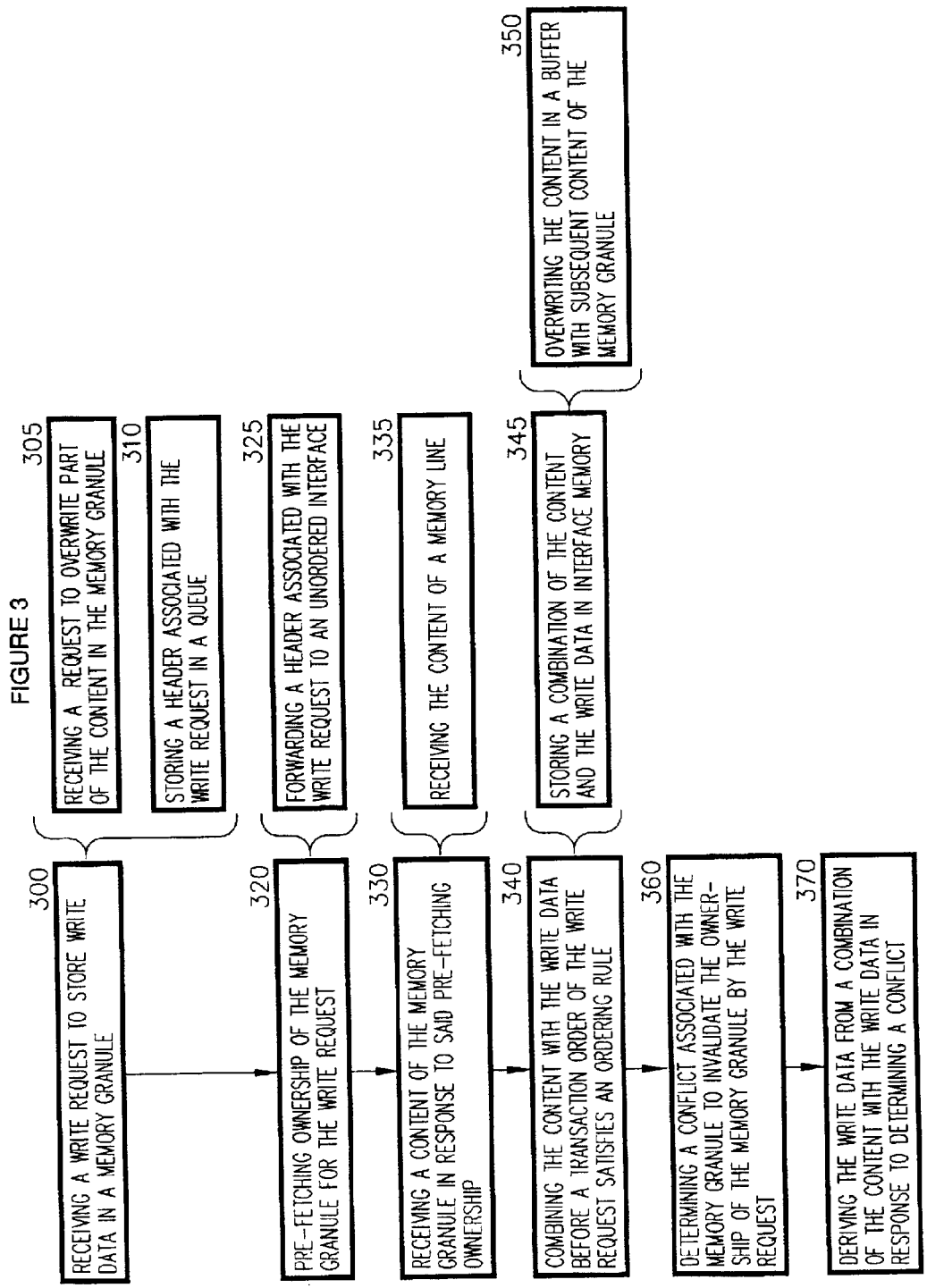
FIG. 3 depicts a flow chart of an embodiment to handle single leaf and multiple leaf conflicts to enhance an upbound path.

Referring now to FIG. 3, there is shown a flow chart of an embodiment to handle single leaf and multiple leaf conflicts to enhance an upbound path. The embodiment comprises receiving a write request to store write data in a memory granule 300; pre-fetching ownership of the memory granule for the write request 320; receiving a content of the memory granule in response to said pre-fetching ownership 330; combining the content with the write data before a transaction order of the write request satisfies an ordering rule 340; determining a conflict associated with the memory granule to invalidate the ownership of the memory granule by the write request 360; and deriving the write data from a combination of the content with the write data in response to determining a conflict 370. Receiving a write request to store write data in a memory granule 300 may receive a transaction from an I/O device such as an Ethernet card or a graphics card. The transaction may comprise write data to update part of the main system memory on the front side bus (FSB). Some systems may write to the main system memory on a granule per transaction basis and the write data may comprise less than a granule of data. For instance, a granule may comprise a memory line or another quantity of memory.

Receiving a write request to store write data in a memory granule 300 may comprise receiving a request to overwrite part of the content in the memory granule 305 and storing a header associated with the write request in a queue 310. Receiving a request to overwrite part of the content in the memory granule 305 may comprise receiving a request and storing the write data of the request in a buffer. The buffer may store the data in granular units such as a memory line. When the write request may comprise less than a memory line of data, the remainder of the line of memory in the buffer may be filled with other bits such as zeroes or ones. Storing a header associated with the write request in a queue 310 may comprise forwarding the header of the write request to an ordering queue to maintain the transaction order of the request while the write data of the write request may be forwarded to a buffer to store pending transaction data.

Pre-fetching ownership of the memory granule for the write request 320 may respond to the receipt of the write request by forwarding an ownership request for the write request to a local request buffer. The local request buffer may store the ownership request to check the request for conflicts with transactions within, for instance, an I/O hub. A snoop filter may perform the conflict check and after a determination that no conflict may exist, the ownership request may be forwarded to the unordered interface. An ownership completion for the write request may be received in response to forwarding the ownership request to the unordered interface and the ownership completion may comprise the content of a granule of memory that may comprise a target of the write request and the completion may comprise data confirming the ownership of the granule by the write request. For example, a hub interface may pre-fetch ownership of a memory line for an upbound transaction via the snoop filter. The snoop filter may receive a response from the unordered interface comprising an ownership completion and forward the ownership completion to the hub interface. After receiving the ownership completion, the hub interface may modify the coherency state of the upbound transaction from a pending state to 'exclusive'. In addition, the content of the memory granule associated with the write request may be forwarded to interface memory of the corresponding I/O hub such as a buffer in the upbound path of the I/O hub.

Subsequently, a processor, peer hub interface, or second hub interface, may transmit a snoop request to the snoop filter for the same memory granule. The snoop filter, in response, may request to invalidate the ownership by the write request and when the write request may not satisfy an ordering rule, the hub interface associated with the write request may steal the ownership from the write request and respond to the snoop filter with an acceptance. Stealing the ownership from the write request may cause a merge controller to invalidate a merger of the content of the memory granule and the write request.

Pre-fetching ownership of the memory granule for the write request 320 may comprise forwarding a header associated with the write request to an unordered interface 325. Forwarding a header associated with the write request to an unordered interface 325 may forward a request such as a port read and invalidate line (PRIL) from interface memory such as an ordering queue to the unordered interface via a local request buffer. PRIL may comprise a request for ownership of a memory granule for a partial write request. In response, the local request buffer may receive a PRIL completion to indicate that the partial write request may own the memory granule.

Receiving a content of the memory granule in response to said pre-fetching ownership 330 may receive the content of the memory granule corresponding to the PRIL at a pending data buffer. In some embodiments, receiving a content of the memory granule in response to said pre-fetching ownership 330 may comprise receiving the content of a memory line 335.

Combining the content with the write data before a transaction order of the write request satisfies an ordering rule 340 may combine write data of a write request with the content of memory to store the write data at the same location as the content. In many embodiments, combining the content with the write data before a transaction order of the write request satisfies an ordering rule 340 may comprise storing a combination of the content and the write data in interface memory 345. Storing a combination of the content and the write data in interface memory 345 may comprise storing the write data at the same location and may reduce the amount of buffer space used to store data associated with a transaction. For example, an agent on an ordered interface, such as an input-output device coupled with a bridge, may issue a series of write transactions and, assuming that the transactions will be performed in order, issue a last transaction to read the same memory content. If the transactions are received by the unordered interface in an order other than the order they are issued, the read may return unpredictable data. Thus, the write transactions may be executed in order prior to the read transaction. The write transactions may comprise write data to write to a memory line but the transactions may comprise less than a granule of data for the intended memory. The granule of memory subject to the write transactions may be read and the corresponding content may be stored in interface memory. A merge controller may combine the content of the granule with the data to be written to the granule in order.

Storing a combination of the content and the write data in interface memory 345 may comprise overwriting the content in a buffer with a subsequent content of the memory granule 350. Overwriting the content in a buffer with a subsequent content of the memory granule 350 may comprise reading the write data of a write transaction and, when the content is stored in a buffer of interface memory, writing over the content in the buffer in accordance with a header associated with the write transaction.

Some embodiments may comprise determining a conflict associated with the memory granule to invalidate the ownership of the memory granule by the write request 360. Determining a conflict associated with the memory granule to invalidate the ownership of the memory granule by the write request 360 may comprise receiving the snoop request for the memory granule, determining that the snoop request conflicts with the ownership pre-fetched for the write request, and invalidating the ownership. For example, the write request may be an upbound transaction for a memory line. An inbound read transaction for the same memory granule may satisfy ordering rules. A snoop filter may request that the hub interface invalidate the ownership of the memory line by the write request. The hub interface may accept the invalidation of the ownership; stealing the ownership from the write request in favor of the inbound read transaction. As a result, the inbound read transaction may transmit upbound a merger of the content and the write request may be invalidated, and, after the inbound read transaction is completed, the upbound transaction may regain ownership by reissuing a request for the ownership. After regaining ownership, the write request may be merged with a new copy of the content of the memory granule.

Further embodiments may comprise deriving the write data from a combination of the content with the write data in response to determining a conflict 370. Deriving the write data from a combination of the content with the write data in response to determining a conflict 370, in response to the invalidation of the pre-fetched ownership of the memory line, may request that the merge controller remove or disregard the combined content and write data associated with the write transaction to store the write data in interface memory. Then, the content may be overwritten by a subsequent content of the memory granule. In some embodiments, a bit associated with the write transaction may be set to indicate that the write data has not been merged with the current content of the corresponding granule of memory such as a bit to indicate that the state of the write request is "invalid". In further embodiments, the merge controller may overwrite the combined content and write data stored in interface memory with the write data. In other embodiments, the merge controller may overwrite the remaining content of the combined content and write data with filler bits such as logical ones or logical zeroes.

In alternative embodiments, each write transaction may be initiated to write data to different granules of memory and the interface memory may store the combined content of each granule with the corresponding write data of the write transactions in one granule of interface memory per write transaction. After satisfying the ordering rule(s) corresponding to each write transaction, the granules of interface memory may be written to memory. Then, the read transaction may read the memory granule.

Figure 4:
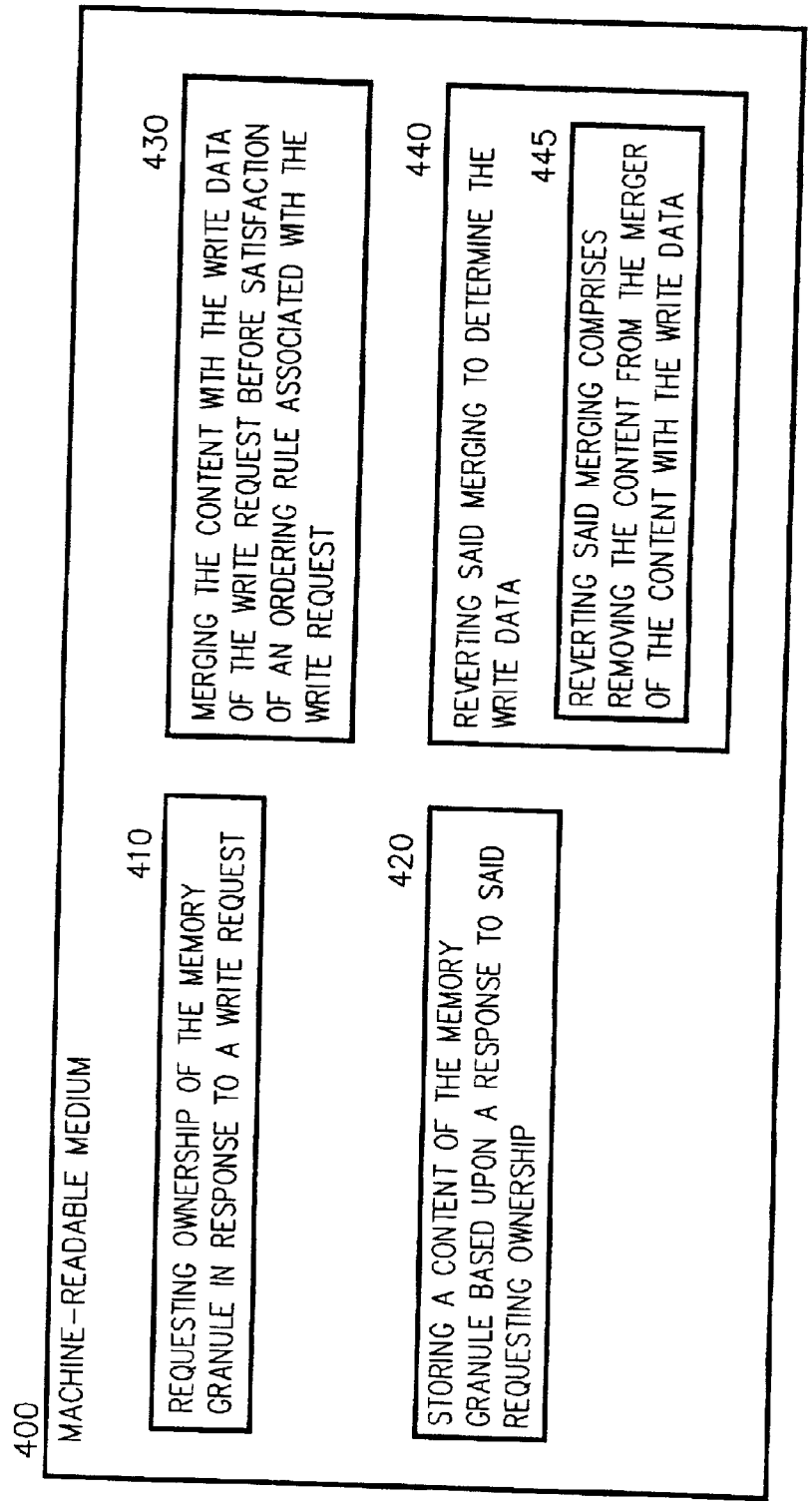
FIG. 4 depicts an embodiment of a machine-readable medium comprising instructions to handle single leaf and multiple leaf conflicts to enhance an upbound path.

Referring now to FIG. 4, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . . Several embodiments of the present invention may comprise more than one machine-readable medium depending on the design of the machine.

In particular, FIG. 4 shows an embodiment of a machine-readable medium 400 comprising instructions for requesting ownership of the memory granule in response to a write request 410, storing a content of the memory granule based upon a response to said requesting ownership 420, merging the content with write data of the write request before satisfaction of an ordering rule associated with the write request 430, and reverting said merging to determine the write data 440. Requesting ownership of the memory granule in response to a write request 410 may comprise instructions to initiate an upbound snoop request to request ownership for a partial write in response to receipt of the partial write. The write data associated with the partial write may be forwarded to a buffer of interface memory to store while awaiting the partial write to be forwarded to an unordered interface. A header of the partial write may be stored in an ordering queue of the interface memory to preserve a transaction order of the partial write in accordance with an ordering rule.

Storing a content of the memory granule based upon a response to said requesting ownership 420 may comprise instructions to store the content of a granule of memory associated with the partial write to facilitate writing the content to a memory granule. The content of the granule may be received from the unordered interface in response to forwarding a request for ownership of the memory granule to the unordered interface.

Merging the content with write data of the write request before satisfaction of an ordering rule associated with the write request 430 may comprise instructions to merge the content with the write data of the partial write in a buffer of the interface memory in accordance with the header of the partial write. Merging the content 430 may facilitate storing the write data of the partial write and the content in a granule of the buffer rather than storing the content in one granule and storing the write data in a second granule.

Some embodiments may further comprise instructions for reverting said merging to determine the write data 440. Reverting said merging to determine the write data 440 may comprise instructions to revert the merging of the content with the write data associated with the partial write after a determination that the content merged with the write data may be invalid.

Reverting said merging to determine the write data 440 may comprise instructions for removing the content from the merger of the content with the write data 445. Removing the content from the merger of the content with the write data 445 may comprise instructions to separate the write data from the merger of the content with the write data and to store the write data at the location of the merger in memory such as a buffer or a queue. In many embodiments, reverting 440 may occur in response to a local conflict or a snoop request.

What is claimed is:

1. An apparatus, comprising:
   interface memory to store a write request and to receive a content of a memory granule associated with the write request from an unordered interface;
   logic circuitry coupled with the unordered interface to request the content in response to the write request; and
   a merge controller coupled with said interface memory to merge the content with the write request prior to satisfaction of an ordering rule associated with the write request.

2. The apparatus of claim 1, further comprising a snoop filter coupled with the interface memory to invalidate the content based upon a conflict.

3. The apparatus of claim 2, wherein said merge controller comprises derivation circuitry to derive the write data from a merger of the content with the write request in response to an invalidation of the content.

4. The apparatus of claim 2, further comprising a coherency interface coupled with the snoop filter to invalidate the content in response to a transaction of a peer hub interface.

5. The apparatus of claim 1, said interface memory comprises a queue coupled with an ordered interface to maintain a transaction order for a header of the write request based upon the ordering rule.

6. The apparatus of claim 1, wherein said interface memory comprises a buffer coupled with said merge controller to store a merger of write data associated with the write request and the content.

7. The apparatus of claim 1, wherein said logic circuitry comprises content request circuitry to forward a header associated with the write request to the unordered interface.

8. The apparatus of claim 1, wherein said logic circuitry comprises merge request circuitry coupled with said merge controller to request a merger of the content with the write request.

9. The apparatus of claim 1, wherein said merge controller comprises overwrite circuitry coupled with said interface circuitry to overwrite part of the content in accordance with the write request.

10. A method, comprising:
    receiving a write request to store write data in a memory granule;
    pre-fetching ownership of the memory granule for the write request;

receiving a content of the memory granule in response to said pre-fetching ownership; and combining the content with the write data before a transaction order of the write request satisfies an ordering rule.

11. The method of claim 10, further comprising determining a conflict associated with the memory granule to invalidate the ownership of the memory granule by the write request.

12. The method of claim 11, further comprising deriving the write data from a combination of the content with the write data in response to determining a conflict.

13. The method of claim 10, wherein said receiving a write request comprises receiving a request to overwrite part of the content in the memory granule.

14. The method of claim 10, wherein said receiving a write request comprises storing a header associated with the write request in a queue.

15. The method of claim 10, wherein said pre-fetching ownership comprises forwarding a header associated with the write request to an unordered interface.

16. The method of claim 10, wherein said receiving a content of the memory granule comprises receiving the content of a memory line.

17. The method of claim 10, wherein said combining the content comprises storing a combination of the content and the write data in interface memory.

18. The method of claim 17, wherein storing a combination comprises overwriting the content in a buffer with a subsequent content of the memory granule.

19. A system, comprising:

an input-output device to initiate a write request comprising write data to modify a content of a memory granule;

a hub interface coupled with said input-output device to maintain a transaction order for the write request according to an ordering rule; and an upbound path coupled with said hub interface to obtain the content and to merge the content with write data prior to satisfaction of the ordering rule.

20. The system of claim 19, further comprising a snoop filter to receive a snoop request to revert a merger of the content with the write data in response to the snoop request.

21. The system of claim 19, wherein said hub interface comprises a queue to maintain the transaction order to forward the write request to an unordered interface after the write request is at the top of the queue.

22. The system of claim 19, wherein said upbound path comprises logic circuitry to forward a merger of the content with the write request to the unordered interface after the transaction order of the write request satisfies the ordering rule.

23. The system of claim 19, wherein said upbound path comprises merge controller in communication with a buffer to combine the write data with the content.

24. A system apparatus, comprising:

a queue coupled with an ordered interface to store a write request;

logic circuitry responsive to said queue to request a content of a memory granule from the unordered interface;

a merge controller in communication with the unordered interface to receive the content and responsive to said logic circuitry to combine the content with write data of the write request;

a buffer in communication with said merge controller to store a combination of the content and the write data; and an unordered interface responsive to said logic circuitry and communicatively coupled with said buffer to forward the combination to the memory granule.

25. The system of claim 24, further comprising a snoop filter responsive to said unordered interface to invalidate an ownership of the memory granule in response to a snoop request.

26. The system of claim 24, further comprising a snoop filter responsive to another hub interface to invalidate an ownership of the memory granule.

27. The system of claim 26, wherein said merge controller comprises derivation circuitry responsive to said snoop filter to derive the write data from the merger.

28. A machine-readable medium containing instructions, which when executed by a machine, cause said machine to perform operations, comprising:

requesting ownership of the memory granule in response to a write request;

storing a content of the memory granule based upon a response to said requesting ownership; and merging the content with write data of the write request before satisfaction of an ordering rule associated with the write request.

29. The machine-readable medium of claim 28, further comprising reverting said merging to determine the write data.

30. The machine-readable medium of claim 29, wherein reverting said merging comprises removing the content from the merger of the content with the write data.

* * * * *